United States Patent [19]

Langen et al.

[11] Patent Number: 5,030,942

[45] Date of Patent: Jul. 9, 1991

[54] PROCESS AND DEVICE FOR MEASURING AND INDICATING LOAD CONDITIONS IN DRIVELINES OF AGRICULTURAL IMPLEMENTS

[75] Inventors: Hans J. Langen, Frechen; Clemens Nienhaus, Lohmar, both of Fed. Rep. of Germany

[73] Assignee: Jean Walterscheid GmbH, Lohmar, Fed. Rep. of Germany

[21] Appl. No.: 485,982

[22] Filed: Feb. 27, 1990

[30] Foreign Application Priority Data

Feb. 27, 1989 [DE] Fed. Rep. of Germany ....... 3906050

[51] Int. Cl.$^5$ ............................................. G08B 21/00
[52] U.S. Cl. ..................................... 340/684; 340/522; 340/540; 340/681
[58] Field of Search ................ 340/684, 681, 540, 522

[56] References Cited

U.S. PATENT DOCUMENTS 4,039,781  8/1977  Kolb ..................... 235/103.5 R
4,263,578  4/1981  Fukuhara et al. ................... 340/681
4,594,163  10/1985  Satoh et al. ........................ 340/681

FOREIGN PATENT DOCUMENTS 2910365  5/1980  Fed. Rep. of Germany .
0137247  4/1985  Fed. Rep. of Germany .

Primary Examiner—Glen R. Swann, III
Attorney, Agent, or Firm—Toren, McGeady & Associates

[57] ABSTRACT

During monitoring of the driveline of an agricultural implement in respect of overloading and the degree of loading, from a first occurrence of slip, the slip revolutions occurring during a measuring cycle are added up. If the number of slip revolutions exceeds a permissible number of slip revolutions, a signal is generated indicating an overloading condition, a new measuring cycle beginning upon release of the signal to be able to take into account the effects resulting from a change in the behavior of the tractor driver, the nature of the signal being changed responsive to the speed differential between the input speed and output speed of a friction coupling permitting relative rotation. Furthermore, the condition of loading is indicated on the basis of the ratio of the actually measured number of slip revolutions to the number of maximum permissible slip revolutions so that the driver receives a warning prior to a blockage or case of overloading which may lead to overheating or destruction of the coupling serving to protect the implement.

10 Claims, 4 Drawing Sheets

PROCESS AND DEVICE FOR MEASURING AND INDICATING LOAD CONDITIONS IN DRIVELINES OF AGRICULTURAL IMPLEMENTS

BACKGROUND OF THE INVENTION

The invention relates to a process and device for releasing a signal which indicates that a predetermined load limit value has been reached in the driveline of an agricultural implement which is driven by a tractor, is self-driving or stationary and which comprises a torque limiting coupling whose input and output speeds are measure. The slip revolutions corresponding to the speed differential being added up.

From EP 0 137 247 A2 there is known a device for protecting a coupling against overheating, which device is arranged between an engine and a gearbox. For protecting the coupling against overheating there is provided a device which determines the driving torque which, via the speed determined, permits the slip values to be added up and which total, via a comparison with preset slip values, is used for releasing warning signals.

DE OS 29 10 365 describes a process for releasing an indication in the case of which each tractor implement is associated with a resistance combination characterizing the respective overload protection and determining the nominal values of an overload coupling via an electronic switching assembly.

From U.S. Pat. No. 4,039,781 it is known to arrange a coupling between a drive and an extrusion machine, which coupling, via speed transmitters, records the input and output speeds and which, via an associated switching assembly, permits the control of the coupling and the release of an acoustic warning signal when overloading occurs.

In the engineering field, there are already prior art processes and devices for measuring the torque existing in a driveline and for releasing signals when a predetermined limit value has been exceeded, with the change in torque being used to determine in advance whether a predetermined limit value has been exceeded. The switching process is initiated before the predetermined limit value is reached so that even before the limit value is reached the signal ensures automatic switching off by disconnecting the coupling (DE 34378087 C2.)

Such processes and devices are not suitable for use in connection with agricultural implements, since in agricultural implements it is necessary to permit short-term overloading if it occurs in the course of starting the implement for accelerating the masses to be moved. Furthermore, the device must be suitable for withstanding the rough operational conditions of agricultural implements.

SUMMARY OF THE INVENTION

Accordingly, it is an object of the present invention to provide a process and device for releasing a signal for indicating that predetermined load limit values have been reached. Furthermore, the process and device are adapted to the operation of agricultural implements which are suitable for being handled by operators and allow the operator to make optimum use of the tractor-/implement combination.

Pursuant to this object, and others which will become apparent hereafter, one aspect of the present invention resides in that the slip revolutions ($I_{gem}$) calculated during a predetermined measuring cycle ($t_{int}$) beginning as from the first occurrence of slip or, if slip continues thereafter, occurring during one of the subsequent measuring cycles ($t_{int}$), release a signal when the number of predetermined permissible slip revolutions ($I_{zul}$) has been exceeded. A new measuring cycle ($t_{int}$) begins after each signal release. At the time when the permissible number of slip revolutions ($I_{zul}$) is exceeded, the quotient is formed of the input speed ($n_1$) and output speed ($n_2$) measured at that time, with the input speed forming the denominator and the output sped the numerator, and the released signal is changed if a predetermined quotient is not reached.

This process ensures that, on the one hand, the driver is informed when a case of overloading has occurred, but that, on the other hand, because a new measuring cycle begins after release of the signal, the change in the driving situation effected by the driver as a result of the signal is taken into account to be able, actually, to indicate a condition. For instance, via changing the driving speed it is possible for the driver to influence the use of power.

For monitoring the entire system, only the coupling slip as a function of time is of interest. There is no need to make reference to the actual speed. Only absolute slip causes the coupling to heat up, thus having a power limiting effect. The directly transmitted power passing through the coupling is of no interest in considering the matter. However, the set nominal torque of the coupling to be monitored is important as it is directly proportional to the energy supplied and thus to heating under the same slip conditions. The coupling and the permissible limits are determined as a function of the respective applications, i.e., they are adapted to the implement driven by the tractor.

The coupling arranged in the driveline for providing protection against overloading acts as a safeguard against a concrete case of overloading, but the driver does not know to what extent he uses the power limits of the coupling and thus of the implement to which the coupling is adapted and which it is to protect.

If the load limits of the coupling are exceeded continuously, this leads to a reduced service life of both the coupling and the implement.

To be able to determine whether the permissible number of slip revolutions is permissibly exceeded for only a brief period or whether there is a risk of blockage, it is proposed that at the time when the permissible number of slip revolutions is exceeded, the quotient should be formed of the input speed and output speed measured at that time. In other words, signals of different quality are generated. If the limit value is exceeded by just a normal amount, i.e., if output speed and input speed deviate only slightly from one another, it is simply indicated to the driver that he is operating in the range of overloading, which condition may be eliminated by reducing the driving speed for example. If there is a greater deviation between output and input speed, the driver receives a signal indicating that there is a risk of the implement being blocked, i.e, that there exists a case of dangerous overloading. As a consequence, the driver can switch off the drive immediately and possibly stop in order to eliminate implement blockage, or remove a stone, for example.

In order to indicate to the driver of a tractor or a self-driven implement whether he uses the power limits of an implement in an optimum way, it is proposed with reference to a further embodiment of the process that a comparative signal should be based on the function $$Rs = \frac{I_{gem}}{t_{gem}} \times \frac{t_{int}}{I_{zul}} \times 100\%,$$

with $I_{gem}$ being the number of slip revolutions determined during the measuring cycle since its commencement, $t_{gem}$ being the time since commencement of the current measuring cycle, $t_{int}$ the duration of the measuring cycle given in the same unit of time as $t_{gem}$, and $I_{zul}$ being the predetermined maximum permissible number of slip revolutions per measuring cycle.

This means that the relative slip is indicated. This method ensures that if the implement is subjected to too high a load during a measuring cycle, a value in excess of 100% is indicated for the relative slip without the maximum permissible number of slip revolutions already having been reached. This information indicates to the operator that the driving speed should be reduced. If this mode of operation continues, the machine may be overloaded in the course of the measuring cycle in question. With the help of this process it is possible to receive a different impression of the load to which the implement is subjected. By adopting a suitable driving strategy, the load conditions of the implement may be improved and the operating speed optimized.

According to the invention, the measuring cycle has a two minute duration.

For most applications a number of four permissible slip revolutions has been found to be adequate, although these may be selected in individual cases as a function of the task of the coupling and the torque setting.

The limit value for the quotient which, if not reached, causes a change in signal should be 0.9, in accordance with the invention.

This means that if the speed on the output end as compared to the input end drops by more than 10% it is assumed that it could be a case of blockage leading to damage to the implement or to the coupling provided for protecting the implement.

For carrying out the process, it is proposed in accordance with the invention that the torque limiting coupling should be a friction coupling, that both the input end and the output end of the friction coupling should be associated with a revolution counter, and that there should be provided an evaluation unit. The evaluation unit comprises a member for forming the speed differential, an adding member and a time member as well as a limit value comparing element connected to a signal transmitter.

The slip revolutions actually occurring during a measuring cycle are added by the adding member. The time member on the one hand serves to limit the measuring cycle and on the other hand to determine the time which elapsed within the measuring cycle. The limit value comparing element determines whether the permissible number of slip revolutions has been exceeded and whether the signal transmitter should be induced to generate a warning signal.

In a further embodiment there are provided a quotient member for forming the quotient of the speeds of the input and output ends of the friction coupling measured by the revolution counters, and an element which compares the quotient limit values, which element is also connected to the signal transmitter.

When the predetermined quotient is not reached, the signal of the signal transmitter is changed so that increased attention is paid by the operator.

According to a further embodiment, the revolution counters have toothed discs with the same number of discs and proximity sensors.

The toothed discs preferably comprise six teeth and six tooth spaced. Such a division, even if it is only a rough division, is sufficient for most agricultural applications. By proposing four permissible slip revolutions during a measuring cycle of two minutes, a number of 24 permissible pulses is thereby obtained. If this number of pulses is exceeded, a warning signal is released.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

The process will be described in connection with the device proposed in accordance with the invention.

Figure 1:
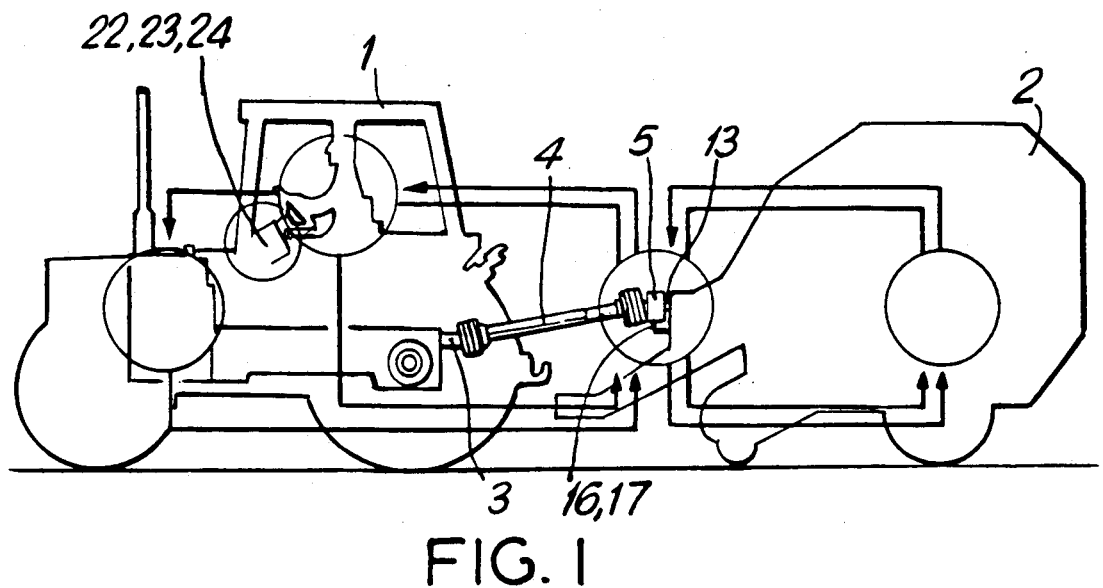
FIG. 1 shows a tractor/implement combination.
Figure 2:
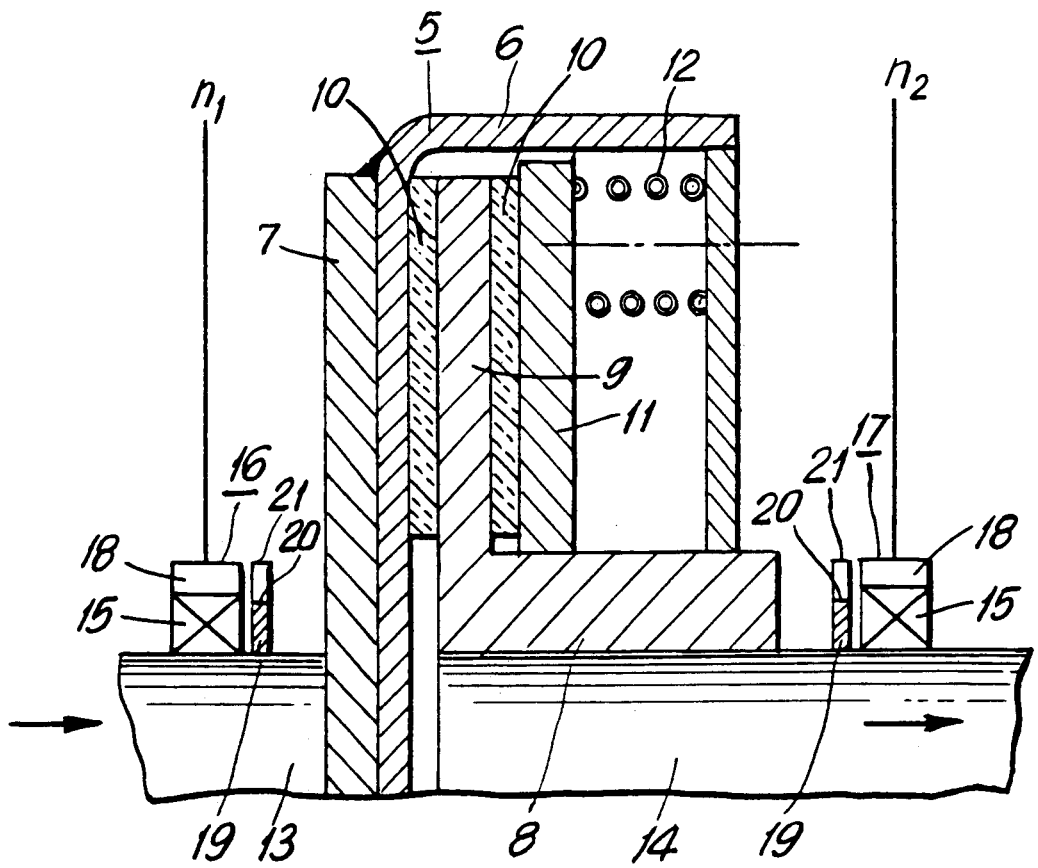
FIG. 2 illustrates the arrangement and design of the measuring device pursuant to the present invention.

FIG. 1 shows a tractor 1 provided for driving and pulling an implement 2. The tractor 1 comprises a power take-off shaft 3 which is connected to one end of a driveshaft 4 whose other end is connected to an input shaft 13 of the implement 2. At the implement end, the driveshaft 4 has been connected to a device for releasing a signal, which drive also includes a friction coupling 5. The friction coupling 5 (FIG. 2) consists of a housing 6 with a connecting flange for connecting to the input shaft 13 of the implement, and with a hub 8 for connecting to the output shaft 14. The hub 8 is provided with a radially extending flange 9 designed as a carrier for friction linings 10. The friction linings 10, on the one hand, rest against the radially extending inside of the housing 6 and, on the other hand, against a pressure plate 11. The pressure plate 11 is pressure-loaded by circumferentially distributed springs 12. The torque to be transmitted by the friction coupling 5 is determined via the number and design of the friction faces and the pairing of friction faces as well as by the pressurizing force of the springs 12. The design of the friction coupling 5 is adapted to the respective implement to be driven.

Figure 4:
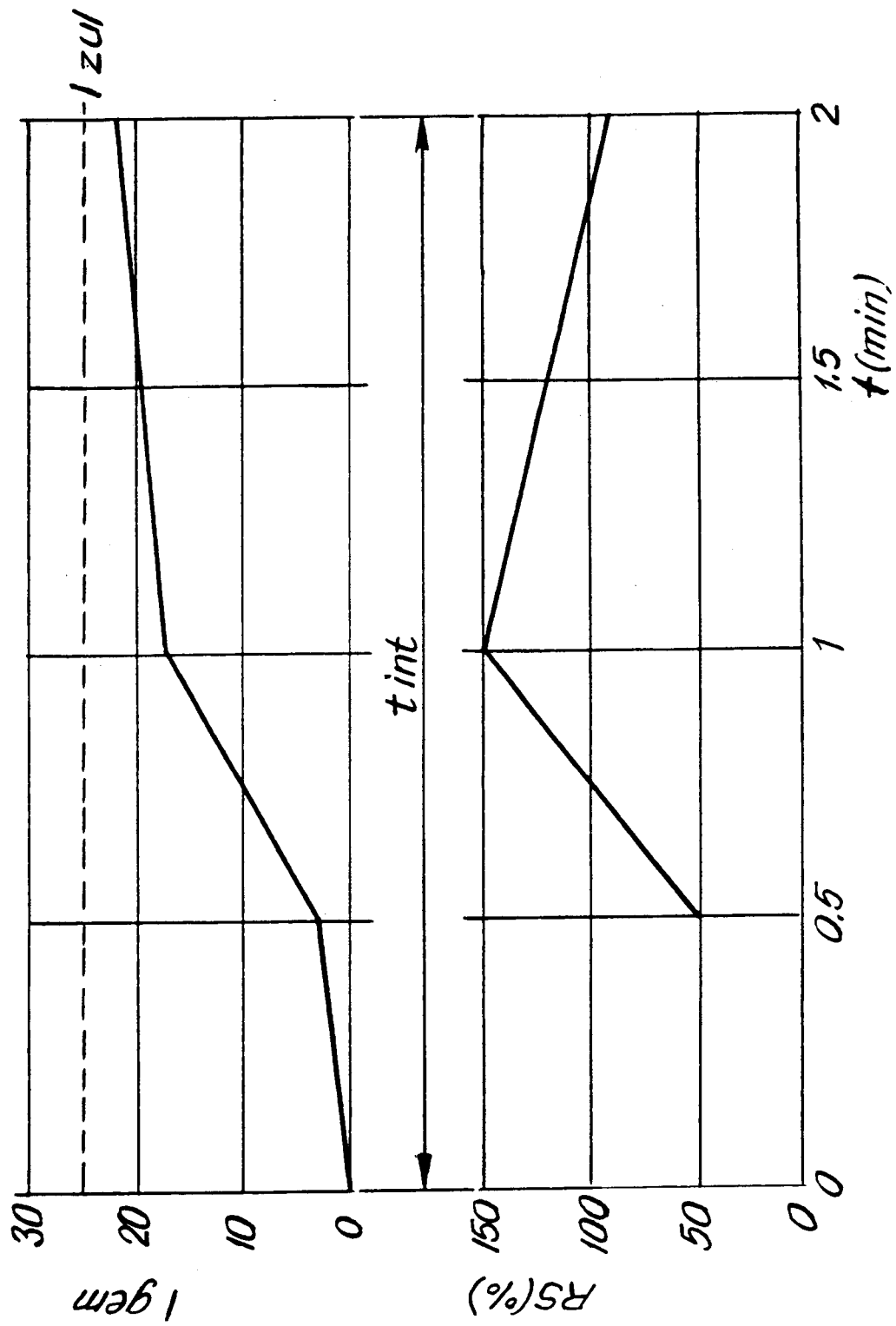
FIG. 4 contains two slip diagrams showing measured slip revolutions and relative slip as a percentage in the measuring cycle.

The input shaft 13 and the output shaft 14 are associated with revolution counters 16, 17 held in bearings 15. The revolution counters 16, 17 each comprise a toothed disc 19 and a proximity sensor 18. The toothed disc 19 is provided with six circumferentially distributed teeth 21 and a corresponding number of tooth spaces 20. If the input shaft 13 and output shaft 14 rotate at the same speed ($n_1 = n_2$), the toothed discs 19 pass through the positions of the sensors 16, 17 at the same time intervals. If the output shaft 14 rotates at a slower speed than the input shaft 13, slip exists between the housing 6 and the hub 8. This slip is determined by measuring, i.e, counting, and adding the pulses occurring as a result of the selected measuring cycle of two minutes and the division of the toothed discs 19, and, compared to the number of permissible slip revolutions of four which, in view of the division of the toothed discs 19, results in 24 pulses, as can be seen in FIG. 4. The upper diagram for instance shows the behavior of the friction coupling 5 during a measuring cycle of 2 minutes in the case of which the pulses are added up. It can be seen that the limit value for the slip revolutions in the measuring cycle is 24 pulses obtained from the permissible number of slip revolutions of 4 multiplied by the number of teeth 21 of the toothed discs 19 ($4 \times 6 = 24$).

Figure 3:
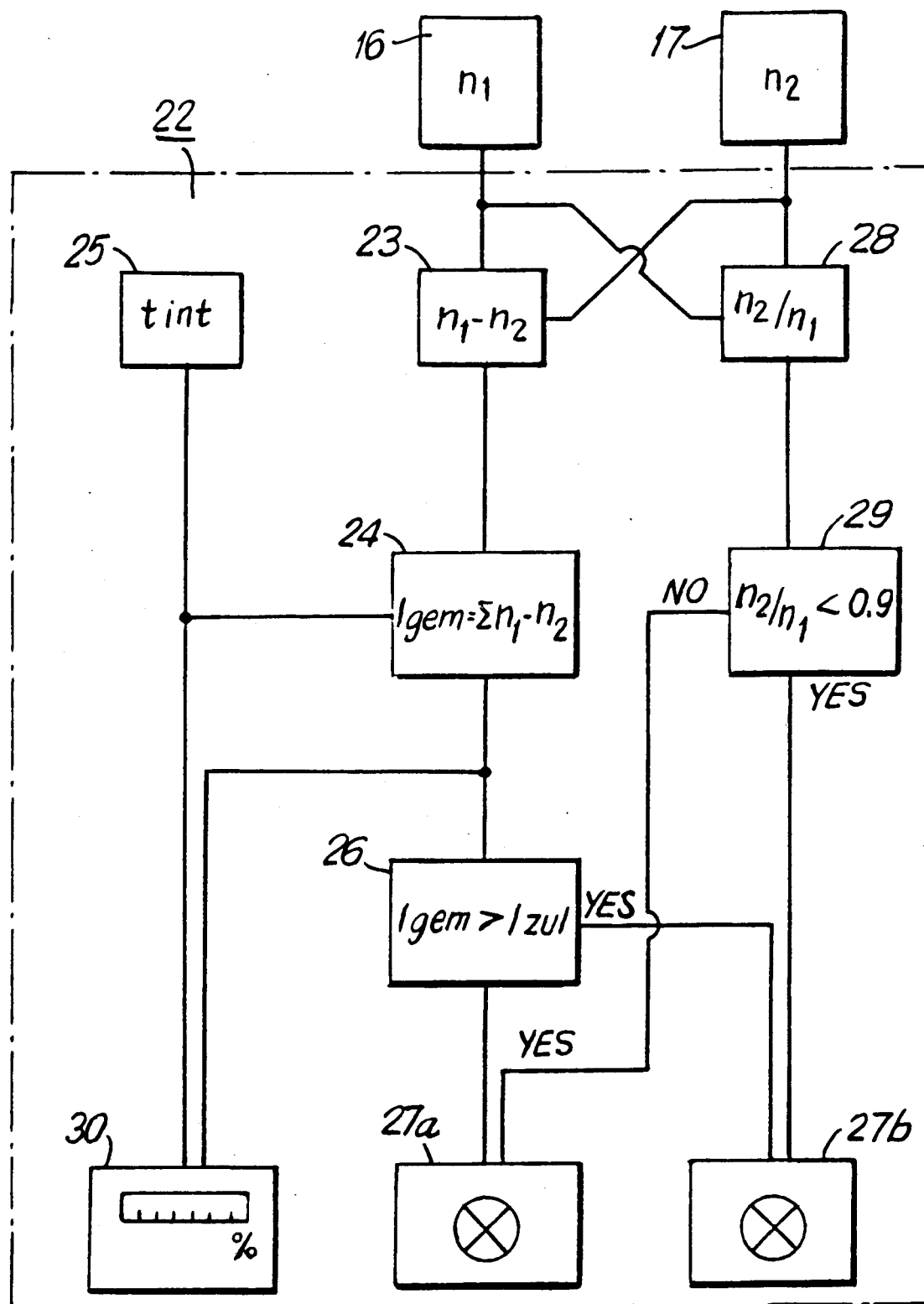
FIG. 3 is a circuit diagram.

FIG. 3 shows a circuit diagram of an evaluation unit 22. The tractor 1, within the field of vision of the tractor driver, is provided with a signal transmitter 27a, 27b and a load indicator 30. These elements are connected via cables to the remainder of the evaluation unit 22. The slip pulses measured by the revolution counters 16, 17 are passed on to the evaluation unit 22 comprising an adding member 24 and a differential member 23. The differential member 23 determines whether there are differences between the input speed $n_1$ and the output speed $n_2$, making use of the pulses as already explained in connection with FIG. 4, upper diagram. The adding member 24 adds up the slip revolutions or parts of slip revolutions (pulses) occurring in the course of a measuring cycle. A limit value comparing device 26 determines whether the added number of slip revolutions $I_{gem}$ is exceeded relative to the permissible number of slip revolutions $I_{zul}$ within the measuring cycle $t_{int}$. If this is the case, the limit value comparing device 26 releases a signal to the signal transmitter 27.

However, in addition to being able to determine whether the predetermined limit value for the slip revolutions $I_{zul}$ has been exceeded, it is desirable to receive an indication of the quality of the signal and in consequence, there is additionally provided a quotient member 28 to which the results measured by the speed counters 16, 17 are transmitted and in which the measured input speed $n_1$ and output speed $n_2$ are related in accordance with the formula $Q_{gem} = n_2/n_1$.

In this way, it is possible to determine to what extent the output speed $n_2$ deviates from the input speed $n_1$. If there is only a slight deviation, the warning signal has to be different from those cases where there is a great deviation, for example. If the output speed $n_2$ deviates only slightly from the input speed $n_1$, the effects on the functioning of the implement and the friction coupling 5 serving to protect the implement are less pronounced than in those cases where there is a great deviation between the speeds, which may indicate implement blockage, for instance. This is the reason why there is given a quotient $Q_{zul}$ as a limit value. If this quotient is not reached and if at the same time the predetermined permissible number of slip revolutions $I_{zul}$ is exceeded, the quality of the signal generated calls for increased attention. In a quotient limit value comparing element 29 it is determined whether the quotient of the output speed $n_2$ and input speed $n_1$ falls below the permissible quotient $Q_{zul}$. If this is the case, the quotient limit value comparing element 29 generates an additional signal for the signal transmitter 27. It has been decided that if the output speed $n_2$ falls short of the input speed $n_1$ by 10%, i.e., with $Q_{zul}$ of 0.9, such an additional signal or a changed signal should be generated.

Figure 5:
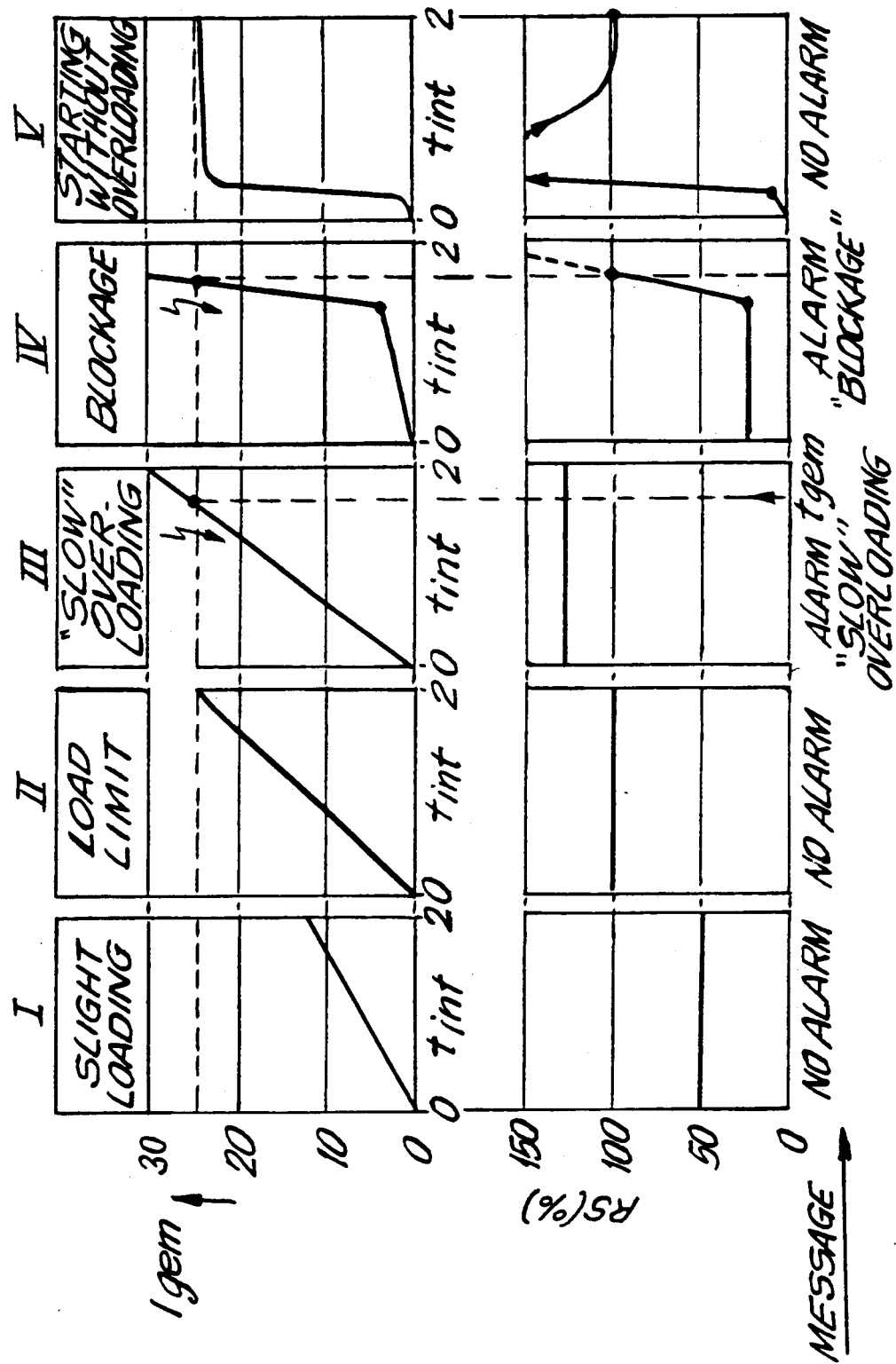
FIG. 5 shows several diagrams with reference to the absolute and relative slip under different load conditions.

The upper half of FIG. 5 shows different load conditions. Diagram I illustrates that during the measuring cycle of two minutes a number of slip revolutions or slip pulses has been reached which is below the permissible number $I_{zul}$ of four slip revolutions. Diagram II shows that at the end of measuring cycle $t_{int}$ the limit value has in fact been reached. In such a case, again no alarm is given. With the load case as illustrated in Diagram III, it can be seen that during the measuring cycle $t_{int}$, at the given point in time $t_{gem}$, the permissible number of slip revolutions $I_{zul}$ was exceeded by the measured or calculated number of slip revolutions $I_{gem}$. An alarm signal is generated, i.e., the signal transmitter 27 reacts. However, as the speeds $n_1$ and $n_2$ of the input shaft 13 and output shaft 14 are still approximately the same, the quality of the signal indicates that it is a case of slow overloading only. With the load case as illustrated in Diagram IV, it can be seen that after an initially small number of slip revolutions, the permissible limit $I_{zul}$ is suddenly exceeded within the current measuring cycle and at the same time it was discovered that the speeds $n_1$ and $n_2$ of the input shaft 13 and output shaft 14 deviate considerably from each other so that an additional signal is released via the quotient limit value comparing element 29 which signal indicates that there obviously exists a case of blockage. In response to this, the operator should stop the drive or tractor 1 in order to prevent fracture or overloading of the implement 2 or the coupling 5.

Diagram V finally shows a starting situation. Although initially, at the beginning of the measuring cycle, a larger number of slip revolutions $I_{gem}$ was identified, the behavior stabilizes so that no alarm signal is generated.

In order to provide the driver additionally with information on the degree of loading of the driven implement 2, the evaluation unit 22 has additionally been provided with a unit 30 indicating the relative slip RS during the course of a measuring cycle $t_{int}$. The relative slip indicates the extent to which the performance limit of four permissible slip revolutions is utilized. The relative slip RS is calculated up to the respective time of measuring within a measuring cycle $t_{int}$ from the number of slip revolutions $I_{gem}$ determined at the time of measuring during the measuring cycle relative to the time $t_{gem}$ which elapsed during this measuring cycle, multiplied by the quotient of the time for a measuring cycle $t_{int}$ and the permissible number of slip revolutions $I_{zul}$ during this measuring cycle $t_{int}$ multiplied by 100%. The value is indicated in %. The principle of relative slip is illustrated in FIG. 4, on the one hand, and with reference to load conditions as given in FIG. 5, on the other hand. It can be seen that in the load case according to Diagram I, a relative slip RS and thus a loading degree of 50% with reference to the permissible slip of four revolutions within the measuring cycle is obtained. In the case of limit loading to Diagram IV, a loading degree of 100% and, in the case of slow overloading, a value between 100 and 150 are identifiable.

This means that well before "overloading" is indicated, the driver can see from the RS value of approximately 125% that he is overloading his implement or coupling. Because of the steeply rising load curve of Diagram IV, the driver also notices from the change in warning that there is a risk of blockage. In connection with Diagram IV which refers to starting, it can be seen that the relative limit values may be exceeded in the measuring interval, but if they do not continue until the end of the first measuring cycle, a warning signal is not released.

The limit speeds for determining the quotient have to be newly determined and specified for each individual application. If a blockage occurs, this condition must be very clearly brought to the attention of the driver, or provision may be made via the evaluation unit 22 for automatic disconnection in order to avoid overheating of the friction coupling 5. The mode of operation will be explained with the help of two practical examples. There are two fixed values: the maximum permissible number of slip revolutions $I_{zul}$ of four, and the duration of the measuring cycle $t_{int}$ of two minutes.

Furthermore, it is a principle of the process in accordance with the invention that a new measuring cycle $t_{int}$ begins as soon as the permissible limit value has been exceeded and an alarm signal has been given. In general, a measuring cycle does not begin until slip has been identified.

EXAMPLE I

Starting an implement with a large rotating mass to be accelerated

This example applies to a forage harvester or similar implements.
Nominal speed of the implement: $n_{Nenn} = 1000$ rpm
Starting speed of the tractor : $n_1 400$ rpm
Starting time : $t_{gem} 1.3$ sec These predetermined realistic conditions mean that during the starting phase there exists a mean speed of 200 rpm. It is assumed that starting takes place with a relatively high speed of the power take-off shaft of the tractor and that such speed remains constant during the starting process. During these very hard starting conditions the limit value of the permissible slip revolutions $I_{zul}$ is just reached. If the starting conditions become harder still it will be indicated to the driver that he has overloaded the system. However, blockage is not indicated because at the point in time when the permissible number of slip revolutions $I_{zul}$ is reached, the output speed is similar to the input speed:

$$\frac{n_2}{n_1} Q_{zul} = 1.$$

EXAMPLE II

Tilling or operating a circular spike harrow—short-term blockage.

This example is based on the following operating conditions:
Driving speed : $v = 6$ km/h $= 1.67$
Speed of power take-off shaft: $n = 1000$ rpm $= 16.67$ sec$^{-1}$ If these operating conditions are observed a warning signal is released if the blockage lasts 0.25 sec. During this period a distance of 40 cm is covered. This means that when the implement crosses a consolidated stretch of soil such as a hard track, which may be connected with considerable slip of the friction coupling 5, no alarm signal is given. Only longer periods of blockage lead to defect indications. This kind of alarm may be accepted by the user.

These examples show that the selected measuring time of two minutes and the predetermined maximum permissible number of four slip revolutions are sufficient in the case of long-term overloading and also that the release of the alarm signal when the time limit slip value is exceeded during the measuring time does justice to any possible impact loads which may occur.

The measuring time or limit value for the maximum permissible slip must be adapted to the respective coupling design to prevent any overheating of the coupling without fail.

For the tractor driver, three different warning or indicating functions are conceivable:
1. An alarm signal for the driver in the case of "slow" overloading of the implement 2, in which:
the permissible number of slip revolutions $I_{zul}$ is exceeded during the measuring cycle; and
the output speed $n_2$ is greater than 90% of the input speed $n_1$ ($Q > 0.9$).

There occurs a warning signal with an interrupted sound with 5 Hz for a period of 2 sec.

2. An alarm signal for the driver upon blockage of implement 2, in which:
the permissible number of slip revolutions $I_{zul}$ of a measuring cycle $t_{int}$ is exceeded; and
the output speed is less than 90% of the input speed ($Q_{gem} < Q_{zul} = 0.9$).

There occurs a change in warning, e.g., a continuous tone of 8 sec or possibly disconnection of the drive.

3. Indications for the driver via the degree of loading (load indicator 30) of the implement 2:
indication refers to the percentage of slip within a measuring cycle with reference to the maximum permissible number of slip revolutions $I_{zul}$ during a measuring cycle.

The following abbreviations have the following meanings:
RS relative slip
$t_{int}$ duration of measuring cycle
$t_{gem}$ time since commencement of the respective measuring cycle
$I_{zul}$ maximum permissible number of slip revolutions within a measuring cycle
$I_{gem}$ actually measured number of slip revolutions within a measuring cycle.

Such an indication may mean that if too high a load is applied to the implement 2 during a measuring cycle $t_{int}$, a value in excess of RS = 100% is indicated without the maximum permissible number of slip revolutions $I_{zul}$ having been reached. However, this information indicates to the driver that the driving speed should be reduced because if this mode of operation continues, the implement will be overloaded in the course of the measuring cycle and in consequence, the friction coupling 5 will be overheated. This is illustrated in FIG. 4. FIG. 3 also shows the effect of the signal.

The signals give the driver an impression of the degree of loading of the implement 2. If he utilizes this information accordingly and if he converts it into a suitable driving strategy, the load conditions of the implement may be improved and the operating speed may be optimized.

While the invention has been illustrated and described as embodied in a process and device for measuring and indicating load conditions in drivelines of agricultural implements, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A process for signalling that a predetermined load limit value has been reached in a driveline of an agricultural implement having a torque-limiting coupling with an input and an output, comprising:

measuring the input and output speeds of the torque-limiting coupling;

calculating the slip revolutions ($I_{gem}$) corresponding to a speed differential between the input and output during a predetermined cycle ($t_{int}$) beginning from a first occurrence of slip or, if slip continues thereafter, during a subsequent measuring cycle ($t_{int}$);

releasing a signal when a predetermined number of permissible slip revolutions ($I_{zul}$) has been exceeded;

beginning a new measuring cycle ($t_{int}$) after each signal release;

forming a quotient of the input speed ($n_1$) and the output speed ($n_2$) at a time when the permissible number of slip revolutions ($I_{zul}$) is exceeded, the input speed ($n_1$) forming the denominator and the output speed ($n_2$) forming the numerator; and changing the released signal if a predetermined quotient ($Q_{zul}$) is not reached.

2. A process according to claim 1, wherein the signal-releasing step includes releasing a reference signal based on the function $$Rs = \frac{I_{gem}}{t_{gem}} \times \frac{t_{int}}{I_{zul}} \times 100\%$$

with $I_{gem}$ being the number of slip revolutions ($I_{gem}$) determined during the measuring cycle ($t_{int}$) since its commencement, $t_{gem}$ the time since commencement of the current measuring cycle ($t_{gem}$), $t_{int}$ the duration of the measuring cycle given in the same unit of time as the time ($t_{gem}$) which elapsed in the current measuring cycle, and ($I_{zul}$) the predetermined maximum permissible number of slip revolutions per measuring cycle.

3. A process according to claim 1, wherein the measuring cycle ($t_{int}$) extends over two minutes.

4. A process according to claim 3, wherein the permissible number of slip revolutions ($I_{zul}$) is four.

5. A process according to claim 1, wherein the predetermined quotient ($Q_{zul}$) has a limit value of 0.9.

6. A device for signaling that a predetermined load limit value has been reached in a driveline of an agricultural implement, comprising:

a torque-limiting coupling designed as a friction coupling (5) and having an input end and an output end; and a evaluation unit (22) including means (23) for forming a speed differential between the input end and the output end of the coupling, adding means (24) for adding slip revolutions corresponding to the speed differential, time means (25) for establishing a predetermined cycle during which the slip revolutions are added, and limit value comparing means (26) for comparing the slip revolutions added by the adding means, with a predetermined number, and releasing a signal when the predetermined number is exceeded, the comparing means being connected to a signal transmitter which transmits the released signal.

7. A device according to claim 6, and further comprising revolution counting (16, 17) means for measuring speeds ($n_1$, $n_2$) of input and output ends of the friction coupling (5), means (28) for forming a quotient of the speeds ($N_1$, $n_2$) of the input and output ends of the friction coupling (5) measured by the revolution counters (16, 17), as well as a comparator element (29), which is also connected to the signal transmitter.

8. A device according to claim 7, wherein the revolution counting means (16, 17) includes toothed discs (19) having the same number of teeth and proximity sensors (18).

9. A device according to claim 8, wherein the toothed discs having six teeth (21) and six toothed spaces (20).

10. An apparatus for signalling that a predetermined load limit value has been reached in a driveline of an agricultural implement having a torque-limiting coupling with an input and an output, comprising:

means for measuring the input and output speeds of the torque-limiting coupling;

means for calculating the slip revolutions ($I_{gem}$) corresponding to a speed differential between the input and output during a predetermined cycle ($t_{int}$) beginning from a first occurrence of slip or, if slip continues thereafter, during a subsequent measuring cycle ($t_{int}$);

means for releasing a signal when a predetermined number of permissible slip revolutions ($I_{zul}$) has been exceeded;

means for beginning a new measuring cycle ($t_{int}$) after each signal release;

means for forming a quotient of the input speed ($n_1$) and the output speed ($n_2$) at a time when the permissible number of slip revolutions ($I_{zul}$) is exceeded, the input speed ($n_1$) forming the denominator and the output speed ($n_2$) forming the numerator; and means for changing the released signal if a predetermined quotient ($Q_{zul}$) is not reached.

* * * * *